US011870198B2

(12) United States Patent
Smith et al.

(10) Patent No.: US 11,870,198 B2
(45) Date of Patent: Jan. 9, 2024

(54) HIGH FREQUENCY ELECTRICAL CONNECTOR

(71) Applicant: Amphenol Corporation, Wallingford, CT (US)

(72) Inventors: James Todd Smith, Portland, OR (US); Michael A. Hoyack, Sandy Hook, CT (US); Owen R. Barthelmes, Putnam Valley, NY (US)

(73) Assignee: Amphenol Corporation, Wallingford, CT (US)

(*) Notice: Subject to any disclaimer, the term of this patent is extended or adjusted under 35 U.S.C. 154(b) by 0 days.

(21) Appl. No.: 17/585,515

(22) Filed: Jan. 26, 2022

(65) Prior Publication Data

US 2022/0149544 A1 May 12, 2022

Related U.S. Application Data

(63) Continuation of application No. 16/871,114, filed on May 11, 2020, now Pat. No. 11,509,075.

(Continued)

(51) Int. Cl.
*H01R 9/05* (2006.01)
*H01R 13/405* (2006.01)
(Continued)

(52) U.S. Cl.
CPC ......... *H01R 9/0521* (2013.01); *H01R 9/0515* (2013.01); *H01R 9/0527* (2013.01);
(Continued)

(58) Field of Classification Search
CPC ....................... H01R 13/5202; H01R 2103/00; H01R 24/40; H01R 13/405; H01R 13/502;
(Continued)

(56) References Cited

U.S. PATENT DOCUMENTS 3,719,918 A * 3/1973 Kerr .................... H01R 13/746 439/680
3,998,515 A * 12/1976 Panek ................. H01R 13/746 439/589
(Continued)

FOREIGN PATENT DOCUMENTS

CN 103378429 A 10/2013
CN 107104320 A 8/2017
(Continued)

OTHER PUBLICATIONS

Amphenol Broadband Solutions, Coaxiel Connector Information Sheet, Type: QC ll-Series 11 Universal, Ni, Quickshield, 2 pages.
(Continued)

*Primary Examiner* — Gary F Paumen
(74) *Attorney, Agent, or Firm* — CANTOR COLBURN LLP

(57) ABSTRACT

An electrical connector that has a conductive shell supporting at least one signal contact therein and that has a front end for mating with a mating connector and a back end opposite the front end for electrically connecting to a coaxial cable. A ground connection is located inside of the conductive shell. A coupling member is rotatably coupled to the conductive shell and has an engagement feature for mechanically engaging a support panel associated with the mating connector. A sealing member is disposed on the conductive shell that is configured to provide an environmental seal between the conductive shell and the support panel when the conductive shell is mated with the mating connector.

16 Claims, 5 Drawing Sheets

Related U.S. Application Data

(60) Provisional application No. 62/934,047, filed on Nov. 12, 2019.

(51) Int. Cl.
*H01R 13/502* (2006.01)
*H01R 13/652* (2006.01)
*H01R 24/50* (2011.01)
*H01R 24/54* (2011.01)
*H01R 13/6582* (2011.01)

(52) U.S. Cl.
CPC ......... *H01R 13/405* (2013.01); *H01R 13/502* (2013.01); *H01R 13/652* (2013.01); *H01R 13/6582* (2013.01); *H01R 24/50* (2013.01); *H01R 24/54* (2013.01)

(58) Field of Classification Search
CPC .. H01R 13/652; H01R 13/6582; H01R 24/50; H01R 24/54; H01R 9/0521; H01R 9/0527; H01R 9/0515
USPC .......................... 439/587, 578, 556, 559, 567
See application file for complete search history.

(56) References Cited

U.S. PATENT DOCUMENTS 4,072,386 A 2/1978 Wallo
4,088,381 A * 5/1978 Harnett ................ H01R 13/521 376/463
4,295,701 A * 10/1981 Gunn ................... H01R 13/523 439/271
4,492,421 A * 1/1985 Ito .......................... H01B 17/30 439/271
4,533,194 A 8/1985 Boichut et al.
4,598,961 A 7/1986 Cohen
4,666,231 A 5/1987 Sheesley et al.
4,674,809 A 6/1987 Hollyday et al.
4,697,859 A 10/1987 Fisher, Jr.
4,941,846 A 7/1990 Guimond et al.
D312,813 S 12/1990 Takizawa
D313,067 S 12/1990 Kotake et al.
5,011,415 A 4/1991 Suzuki et al.
5,176,533 A 1/1993 Sakurai et al.
5,217,391 A 6/1993 Fisher, Jr.
5,547,400 A 8/1996 Wright
5,562,506 A 10/1996 Wright
5,595,499 A 1/1997 Zander et al.
5,645,454 A 7/1997 Kosmala
D451,073 S 11/2001 Yasuda et al.
6,623,277 B1 9/2003 Zhu et al.
6,663,434 B1 12/2003 Wu
6,682,368 B2 1/2004 Murr et al.
6,692,286 B1 2/2004 De Cet
6,695,644 B2 2/2004 Zhao et al.
6,702,611 B1 * 3/2004 Miyazaki ........... H01R 13/6593 439/564
6,786,757 B2 9/2004 Pocrass
D501,649 S 2/2005 Yang et al.
6,942,520 B2 * 9/2005 Barlian .............. H01R 13/6277 439/352
6,976,872 B1 12/2005 Wild et al.
7,086,867 B2 8/2006 Nakagawa et al.
7,204,720 B1 4/2007 Shiu
7,281,947 B2 10/2007 Pescatore
D572,197 S 7/2008 Chawgo et al.
D574,783 S 8/2008 Chawgo et al.
D577,681 S 9/2008 Amidon
7,481,673 B1 1/2009 Qu et al.
7,604,513 B2 10/2009 Wang et al.
7,651,344 B2 1/2010 Wu
7,758,370 B1 7/2010 Flaherty
7,914,344 B2 3/2011 Tin et al.
7,927,108 B2 4/2011 Gong et al.
7,972,158 B2 7/2011 Wild et al.
7,997,930 B2 8/2011 Ehret et al.
D646,226 S 10/2011 Purdy et al.
8,087,954 B2 1/2012 Fuchs
8,162,672 B2 4/2012 Huang
8,388,377 B2 3/2013 Zraik
8,801,459 B2 8/2014 Mrowka
8,961,224 B2 2/2015 Grek et al.
D741,802 S 10/2015 Davidson, Jr.
D741,803 S 10/2015 Davidson, Jr.
D749,519 S 2/2016 Su et al.
9,384,872 B2 7/2016 Wild et al.
9,461,424 B2 10/2016 Kao et al.
D777,112 S 1/2017 Watkins
9,559,458 B2 1/2017 Zhang et al.
D779,427 S 2/2017 Juds et al.
9,633,765 B2 4/2017 Natoli et al.
9,735,531 B2 8/2017 Zhu et al.
10,060,564 B2 8/2018 Minger et al.
D878,297 S 3/2020 Holloway
10,741,972 B2 8/2020 Iwamoto et al.
10,797,412 B2 10/2020 Barthelmes et al.
10,826,230 B1 11/2020 Goebel et al.
D947,124 S 3/2022 Cao et al.
D948,441 S 4/2022 Takano et al.
2003/0139081 A1 7/2003 Hall et al.
2003/0178845 A1 9/2003 Islam
2006/0160415 A1 * 7/2006 Pollock .............. H01R 13/5202 439/559
2006/0199431 A1 9/2006 Paynter
2006/0216990 A1 9/2006 Montena
2009/0215315 A1 8/2009 Cheng
2010/0227504 A1 9/2010 Wang et al.
2010/0297875 A1 11/2010 Purdy et al.
2011/0143603 A1 6/2011 Huang et al.
2011/0165789 A1 7/2011 Sykes
2012/0064765 A1 3/2012 Islam
2012/0129384 A1 5/2012 Van Swearingen
2013/0012063 A1 1/2013 Thomas et al.
2015/0167875 A1 6/2015 Huang
2015/0180142 A1 * 6/2015 Tremba ................ H01R 9/0524 439/578
2016/0204556 A1 7/2016 Lin et al.
2017/0054258 A1 2/2017 Little et al.
2019/0020149 A1 1/2019 Wu et al.
2019/0157778 A1 5/2019 Barthelmes et al.
2020/0350711 A1 11/2020 Barthelmes et al.
2020/0350712 A1 11/2020 Barthelmes et al.
2021/0104828 A1 4/2021 Barthelmes et al.
2021/0143564 A1 5/2021 Smith et al.
2021/0265788 A1 8/2021 Smith et al.
2021/0265789 A1 8/2021 Smith et al.
2022/0037841 A1 2/2022 Morello et al.

FOREIGN PATENT DOCUMENTS

FR 2990069 A1 11/2013
WO 2010114068 A1 10/2010
WO 2016097696 A1 6/2016
WO 2021167695 A1 8/2021

OTHER PUBLICATIONS

European Search Report issued in EP Application No. 18207632.3 dated Jul. 10, 2019.
Final Rejection issued in U.S. Appl. No. 16/930,532 dated Dec. 16, 2020, 11 pages.
Gilbert Engineering/Corning GAF-UR-11-PL RG11 Plenum Ultrarange Compression Connector, https://www.tonercable.com/products/gaf-ur-11-pl-rg11-plenum-ultrarange-compression-connector.php., 2 pages.
https://picclick.com/Platinum-Tools-18051C-SealSmart-Compression-F-Connectors-for-381513254656.html., 6 pages.
International Search Report issued in Application No. PCT/US2020/066455 dated May 12, 2021, 5 pages.
Invitation to Pay Additional Fees with Partial Search Report and Provisional Opinion issued in International Application No. PCT/US2020/066455 dated Mar. 18, 2021, 9 pages.

(56) References Cited

OTHER PUBLICATIONS

MCX Connector Series, https://www.amphenolrf.com/connectors/mcx.html, copyright 2019.
Non-Final Office Action issued in U.S. Appl. No. 29/724,964 dated Jun. 24, 2021, 5 pages.
Non-Final Office Action issued in U.S. Appl. No. 16/196,893 dated Sep. 12, 2019, 14 pages.
Non-Final Office Action issued in U.S. Appl. No. 16/871,114 dated Apr. 7, 2021, 7 pages.
Non-Final Office Action issued in U.S. Appl. No. 16/930,532 dated Sep. 9, 2020, 8 pages.
Non-Final Office Action issued in U.S. Appl. No. 16/930,537 dated Jul. 1, 2021, 11 pages.
Non-Final Office Action issued in U.S. Appl. No. 17/129,309 dated Dec. 24, 2021, 6 pages.
Non-Final Office Action issued in U.S. Appl. No. 17/129,325 dated Feb. 18, 2021, 10 pages.
Office Action issued in Chinese Patent Application No. 201811393059.6 dated Jun. 11, 2021, with English Translation, 18 pages.
Search Report issued in Chinese Application No. 2018113930596 dated Jun. 3, 2021.
SSMB Connector Series, https://www.amphenolrf.com/connectors/ssmb.html, copyright 2019.
Written Opinion issued in Application No. PCT/US2020/066455 dated May 12, 2021, 9 pages.
Non-Final Office Action for U.S. Appl. No. 17/584,323, filed Jan. 25, 2022; Notification dated Jul. 19, 2023; 32 pages.

* cited by examiner

HIGH FREQUENCY ELECTRICAL CONNECTOR

CROSS-REFERENCE TO RELATED APPLICATIONS

This application is a continuation of U.S. Non-provisional application No. 16/871,114, filed May 11, 2020, which claims priority to U.S. Provisional Application Ser. No. 62/1934,047, filed on Nov. 12, 2019, entitled High Frequency Electrical Connector and may relate to commonly owned U.S. application Ser. No. 16/196,893, filed on Nov. 20, 2018, (now granted as US 10,797,412) entitled High Frequency Electrical Connector, and all of which are incorporated by reference in their entirety herein.

FIELD OF THE INVENTION

The present disclosure relates to high frequency electrical connectors, such as for CATV networks, that are reliable and consistent, whether used indoors or outdoors.

BACKGROUND

CATV networks are used to deliver high speed data (e.g. internet and entertainment) to households and businesses. The need for increased data speeds and bandwidth is driving the development and deployment of enhanced or upgraded networks. Current networks are defined by DOC SIS (Data Over Cable Service Interface Specification). The current networks are DOCSIS 3.1 which has a maximum frequency of 1.2 GHz. The next generation networks in standardization is DOCSIS 4.0 which will include "ESD" (Extended Spectrum DOCSIS) and increase the maximum frequency to 1.8 GHz. These systems are expected to deploy within the next year and will require upgrades to the entire "plant" (wired network) to operate to the higher frequency.

There is an increased need to prevent RF leakage and RF ingress for all enclosures and transmission lines in CATV networks, including RF connectors and cables, to improve RF performance. This need is increasing because, as more RF spectrum is licensed for commercial use, there is increased opportunity for crosstalk between systems operating in the same spectrum. For optimal RF performance, the connector interfaces and cable transmission lines need to prevent ingress of these wireless signals into wired broadband systems.

The legacy Type F connectors for CATV typically do not perform well at higher frequencies. There is also a well-known robustness and reliability concern with Type F connectors. This is particularly a concern if an installer fails to properly tighten the connector to its mating component, which allows considerable RF leakage resulting in a degraded RF performance. These connector commonly fail CATV networks due to inconsistent and unreliable sealing in outdoor applications.

Therefore, there is a need for CATV electrical connectors that provide reliable and consistent RF performance, even at high frequencies, whether used indoors or outdoors.

SUMMARY

Accordingly, the present disclosure may provide a high frequency electrical connector that has a conductive shell supporting at least one signal contact therein and that has a front end for mating with a mating connector and a back end opposite the front end for electrically connecting to a coaxial cable. A ground connection can be located inside of the conductive shell. A coupling member may be rotatably coupled to the conductive shell and has an engagement feature for mechanically engaging a support panel associated with the mating connector. A sealing member can be disposed on the conductive shell that is configured to provide an environmental seal between the conductive shell and the support panel when the conductive shell is mated with the mating connector.

In certain embodiments, the signal contact is a pin, the coupling member is a nut or sleeve, the sealing member is a sealing ring disposed around the front end of the conductive shell, and the back end of the conductive shell is configured to terminate the coaxial cable; the engagement feature of the coupling member is inner threads; the coupling member is a nut with front and back sections, the front section has the inner threads and the back section has an outer gripping surface; the coupling member is a sleeve that includes an elongated body with a front section that has the inner threads, a middle section that has an outer gripping surface, and a back section configured to cover a terminated end of the coaxial cable; and/or the sleeve may be formed of a plastic or metal material.

In other embodiments, the ground connection is a primary ground connection that is one or more inner contact points on an inner surface of the conductive shell that are configured to electrically engage the mating connector to form a primary grounding path; a secondary ground connection is provided on the outside of the conductive shell configured to electrically engage the mating connector, thereby defining a secondary grounding path through the electrical connector and the mating connector that is separate from the primary grounding path; and/or the at least one signal contact is set-back such that the front end of the conductive shell extends past an interface end of the at least one signal contact for a closed entry mating with the mating connector.

The present disclosure may also provide an electrical connector assembly that comprises a receptacle that includes a conductive shell supporting at least one socket contact therein, the conductive shell has a front end and has a back end configured to electrically connect to a printed circuit board. A support panel may be provided that is associated with the receptacle. For example, the receptacle may be mounted in the support panel. A plug that includes a conductive shell supporting at least one pin contact is configured to mate with the at least one socket contact of the receptacle. The conductive shell of the plug has a front end for mating with the front end of the receptacle and a back end configured to electrically connect to a coaxial cable. A sealing member can be disposed on the conductive shell and may be configured to provide an environmental seal at or near a mating interface of the receptacle and plug. A coupling member can be coupled to the conductive shell of the plug and may be configured to provide a mechanical engagement between the receptacle and plug when the receptacle and plug are mated for increased mechanical strength of the assembly.

In some embodiments, the coupling member is rotatably coupled to the conductive shell of the plug and has an engagement feature configured to engage a corresponding engagement feature of the support panel; the engagement feature of the coupling member is inner threads at a front section of the coupling member and the corresponding engagement feature of the support panel is outer threads; the coupling member is a nut that is axially movable with respect to the conductive shell of the plug between a disengaged position and an engaged position; and/or the coupling member is a sleeve that includes an elongated body with a back section configured to cover an end of the coaxial cable and a middle section between the front and back sections that has an outer gripping surface.

In other embodiments of the present disclosure, the receptacle is configured to be mounted in the support panel, which has a threaded body that corresponds to the inner threads of the coupling member for providing the mechanical connection between the plug and the receptacle; the front ends of the receptacle and plug mate with one another such that the signal and pin contacts engage one another, thereby mechanically and electrically connecting the receptacle and plug; and/or the sealing member is a sealing ring disposed around the front end of the conductive shell of the plug;

In further embodiments of the present disclosure, the receptacle includes a receptacle ground connection located inside or on the conductive shell and the plug includes a plug ground connection may be located on the conductive shell of the plug; the receptacle and plug ground connections form a primary grounding path through the assembly and wherein the receptacle and plug have secondary ground connections, respectively, that form a secondary grounding path through the assembly separate from the primary grounding path; the receptacle primary ground connection is one or more inner contact points inside of the conductive shell of the receptacle; and the plug primary ground connection is one or more inner contact points on an inner surface of the conductive shell of the plug configured to connect with the one or more inner contact points of the receptacle primary ground connection to form the primary grounding path; and/or the secondary ground connection of the receptacle is located on an inner surface of the conductive shell of the receptacle; and the secondary ground connection of the plug is located on an outer surface of the conductive shell of the plug.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawing figures.

DETAILED DESCRIPTION

Referring to the figures, the present disclosure relates to exemplary embodiments of electrical connectors and the assembly thereof that are designed to significantly improve RF performance, such as for high frequency applications. The present disclosure may be, for example, RF connectors and assemblies for CATV broadband applications configured to provide an intuitive user experience suitable for consumer level usage; enable bandwidth expansion for future systems and protocols, including convergence with 5G; and/or achieve high RF ingress protection against current and future wireless bands. The connector technology of the present disclosure is designed to provide consistent performance with headroom for future network enhancements with higher frequency capability, e.g. 6 GHz and beyond, for both indoor and outdoor applications for coax to the home/business. Also, the connectors of the present disclosure are designed to provide robustness, sealing, and reliability when used outdoors.

An electrical connector or assembly 100 that has electrical connectors or components 102 and 104, according to an exemplary embodiment of the present disclosure, are designed to improve RF performance at high frequencies by suppressing RF leakage and ingress at the interface of the assembled connectors, whether use in an indoor or outdoor application. Assembly 100 may also incorporate a coupling member 200 configured to provide an additional mechanical engagement between the electrical components 102 and 104 once mated to increase the mechanical strength of the assembly 100, particularly the mechanical strength of the interface of the assembly 100 against cable loading. One or more sealing members, such as sealing member 300, may also be provided with assembly 100 configured to create an environmental seal between the components of the assembly 100, particularly for outdoor applications.

Figure 1A:
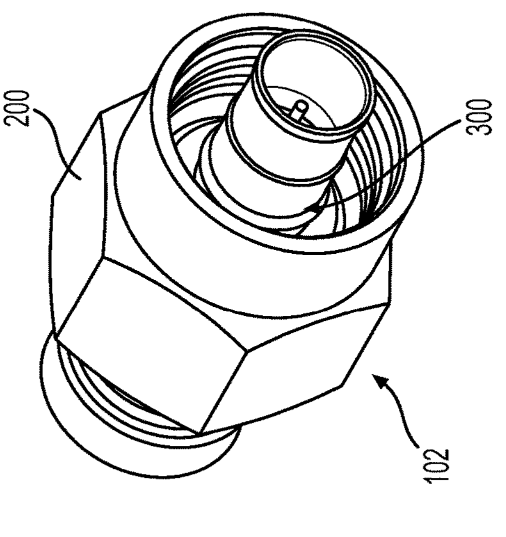
FIG. 1*a* is a perspective view of a mating connector or component of the electrical connector assembly according to an exemplary embodiment of the present disclosure.
Figure 1B:
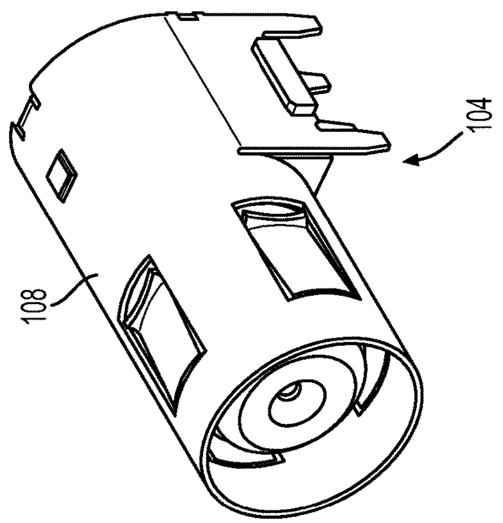
FIG. 1*b* is a perspective views another mating component of the electrical connector assembly thereof according to an exemplary embodiment of the present disclosure.

The connectors or components 102 and 104, may be, for example, a plug and receptacle, respectively, as seen in FIGS. 1*a* and 1*b*. The receptacle 104 may be mounted to a support panel 10 (FIG. 1*c*), that may be a panel or housing wall. Each of the plug and receptacle generally has an outer conductive shell 106 and 108, respectively, and at least one signal contact supported therein, such as a pin 150 or a socket 152, respectively. Each outer shell 106 and 108 may comprise a front end 130 and 132, respectively, for mating with the other mating component and a back end 134 and 136, opposite the front end.

Figure 2A:
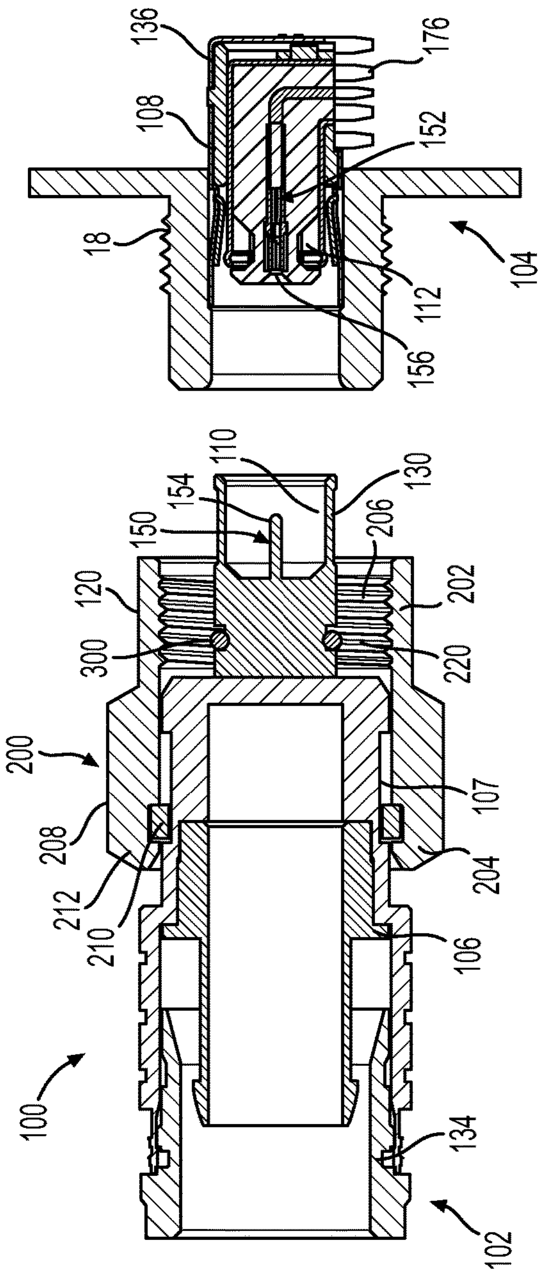
FIG. 2*a* is an exploded cross-sectional view of the mating components illustrated in FIGS. 1*a* and 1*b;*
Figure 2B:
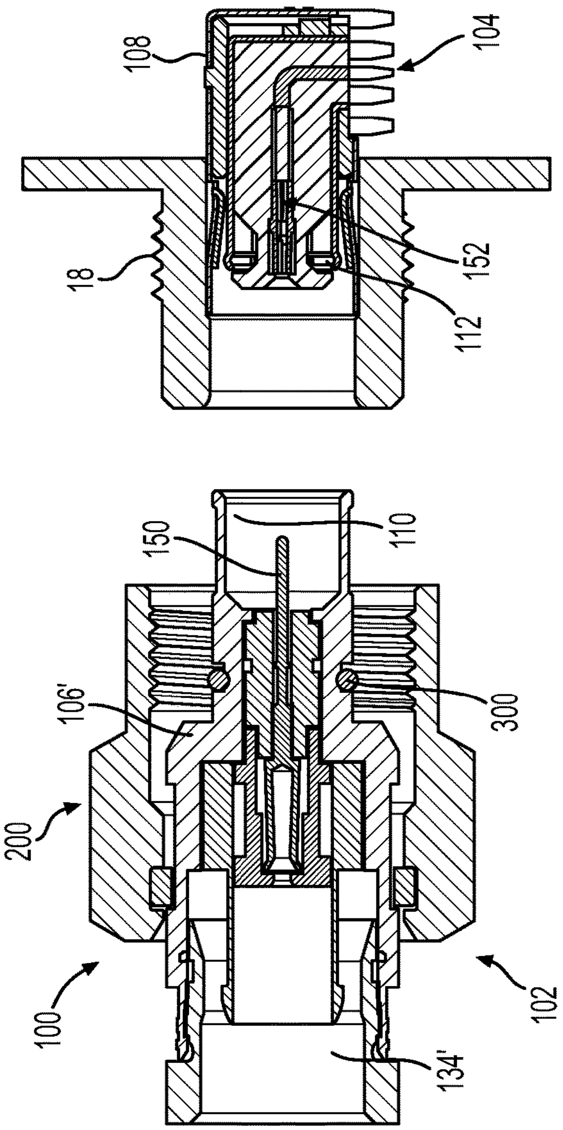
FIG. 2*b* is an exploded cross-sectional view similar to FIG. 2*a*, showing a mating component in accordance with an alternative embodiment.

In an embodiment, the plug 102, and particularly the plug's shell 106 and back end 134, is configured to terminate and electrically connect to a coaxial cable, such as an 11 Series coaxial cable, as seen in FIG. 2*a*. In another embodiment, the plug 102 may have an outer conductive shell 106' with a back end 134' configured to terminate and electrically contact to a different type of coaxial cable, such as a 6 Series coaxial cable, which is smaller than the 11 Series coaxial cable and used for shorter length applications, as seen in FIG. 2*b*. It should be understood that the plug 102 can be modified to accommodate any type of coaxial cable needed for a particular application, including indoor or outdoor uses of the assembly.

Pin contact 150 has an interface end 154 for mating with the corresponding interface end 156 of the socket 152. The end of pin 150 opposite the interface end 154 can be electrically connected to the cable. The back end 136 of the receptacle 104 is configured to electrically connect to a printed circuit board PCB, in a right-hand or straight configuration. And the end of the socket contact 152 opposite its interface end 156 is electrically connectable to the printed circuit board PCB.

As seen in FIGS. 2*a* and 2*b*, the pin contact 150 of plug 102 may be supported in a set-back position. That is, the front end 130 of the shell 106, 106' extends past the interface end 154 of the pin contact 150 to allow for closed entry mating with the receptacle. The front end 130 of plug 102 may be designed for a push-on type engagement with receptacle 104, such that no threads or threaded engagement are needed.

Figure 1C:
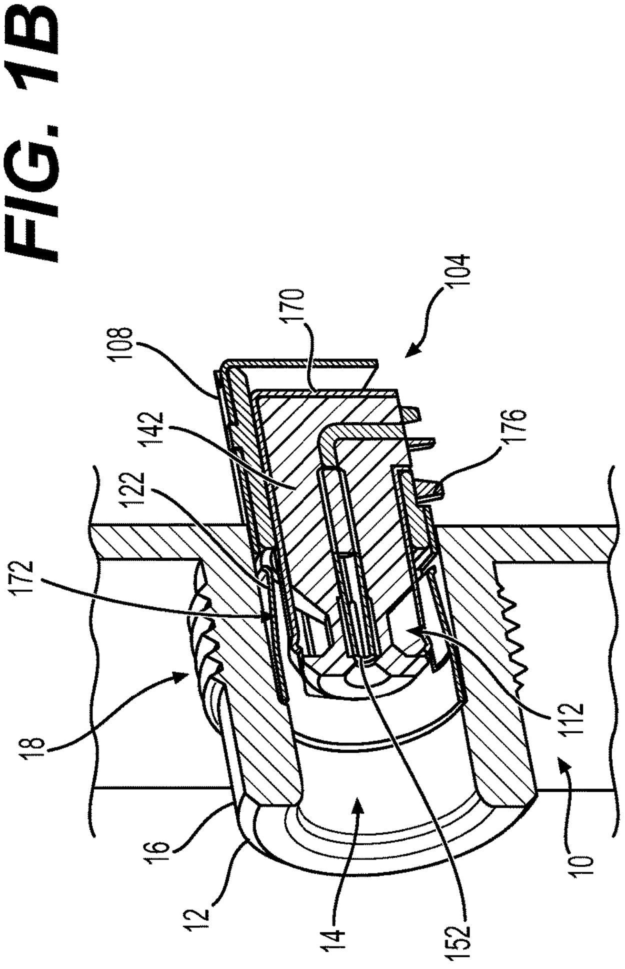
FIG. 1*c* is a perspective sectional view of the mating component illustrated in FIG. 1*b*, showing the mating component mounted in a support.
Figure 1D:
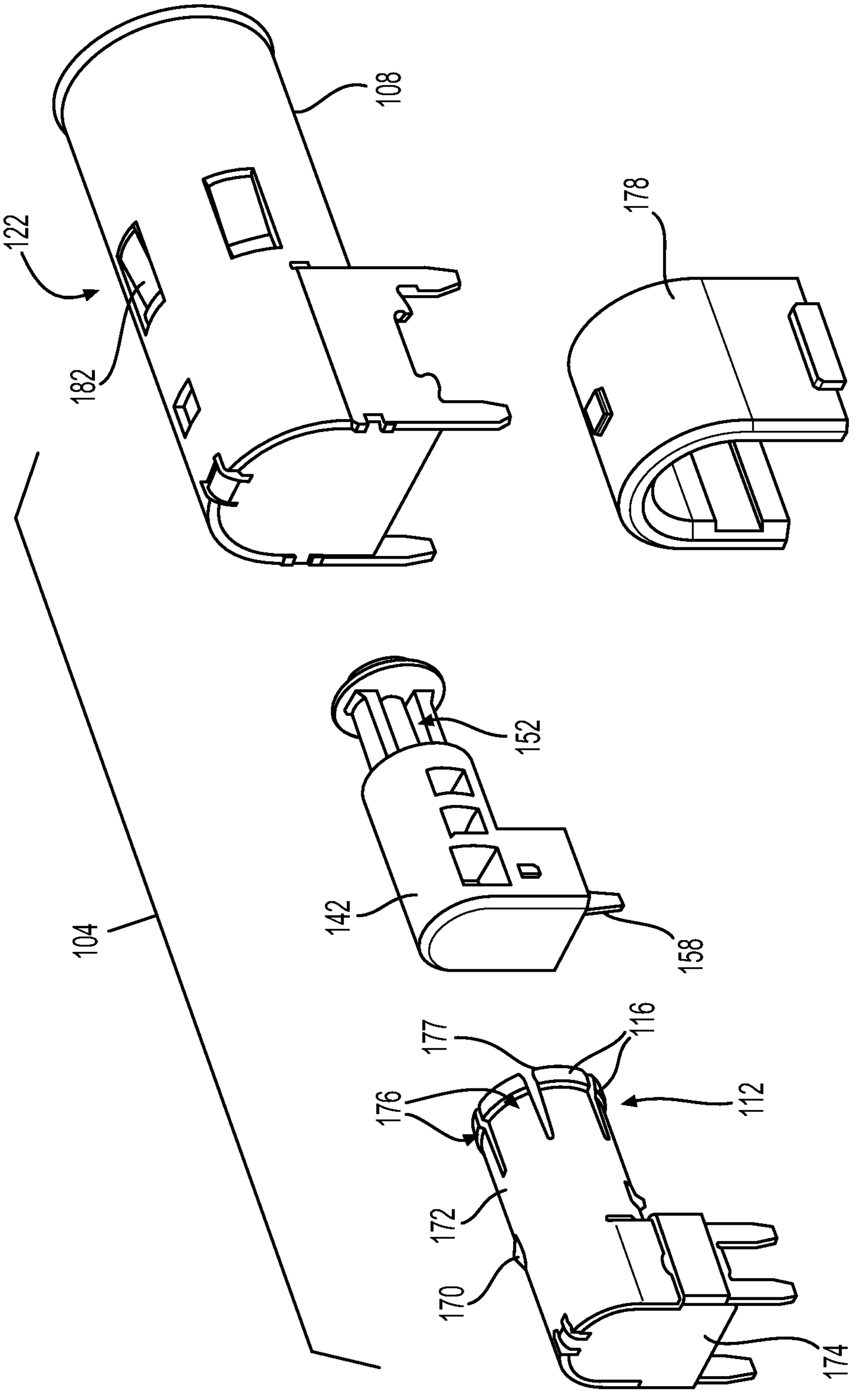
FIG. 1*d* is an exploded perspective view of a mating connector or component of the electrical connector assembly according to an exemplary embodiment of the present disclosure.

As seen in FIGS. 1*c* and 1*d*, receptacle 104 may include an inner conductive shell 170 that is received inside of the outer conductive shell 108, with the dielectric insert 142 supporting the socket contact 152 therein. In an embodiment, the dielectric insert 142 is molded around socket contact 152. Socket contact 152 may be supported in a set-back position, similar to pin contact 150. That is, outer shell 108 may extend past the interface end 156 of socket contact 152, as seen in FIG. 2. The end 158 of socket contact 152 is configures to engage the printed circuit board. Inner shell 170 has a front end 172 for mating with the front end 130 of plug 102 and a back end 174 for electrically engaging the printed circuit board. Front end 172 may include one or more spring fingers 176 by or generally surrounding the interface end 156 of socket contact 152. A lip 177 may be provided at the distal ends of the fingers 176. Both the back end 132 of the outer shell 108 and the back end 174 of inner shell 170 may have one or more tails 176 for engaging the printed circuit board 12, such as by solder or press-fit. The space between the inner surface of the outer shell 108 and the inner shell 170 of the receptacle 104 is a receiving area sized to accommodate the front end 130 of plug 102. A secondary dielectric insert 178 may be provided between the outer shell 108 and the inner shell 170 near their back ends to provide additional support to the receptacle.

The plug 102 and receptacle 104 may have primary ground connections 110 and 112, respectively, configured to form a primary grounding path through the mated components. The ground connections 110 and 112 may be any grounding technique, such as grounding through the conductive surface of the shells 106 or 108 of the connectors, grounding through added ground contacts isolated and connected to the equipment PCB, or grounding through a traditional single ground, and the like. In one embodiment, each of the primary ground connections 110 and 112 is one or more inner contact points inside of the outer shells 106 and 108. The primary ground connections 110 and 112 according to the present disclosure provide a connection to ensure the RF signal is passed through the connector components, plug 102 and receptacle 104, with minimal signal loss.

The inner contact points of the plug's primary ground connection 110 may be located on the inner surface of its outer shell 106 near or at the front end 130 thereof and positioned to engage the inner contact points of the receptacle's primary ground connection 112. The inner contact points of receptacle 104 may be located on inner conductive shell 170, such as on spring fingers at the front end 172 of the shell 170. Alternatively, the inner contact points of the primary ground connections 110 and 112 may be positioned or incorporated into one or more arms, tines, petals, beams, or the like.

The plug and receptacle 102 and 104 may have secondary ground connections 120 (FIG. 2*a*) and 122 (FIG. 1*c*), respectively, that are configured to provide additional grounding at the interface of the connector assembly. The function of the secondary ground connection 120 and 122 according to the present disclosure is to provide a secondary barrier to significantly reduce the power level of the RF signal that leaks out of, or the RF noise that leaks into, the transmission line between the connectors. The secondary ground connections 120 and 122 reduce the leakage or the power level of the leakage to a point that is less than the sensitively of the system where it is used.

Like the primary ground connection, secondary ground connections 120 and 122 of plug 102 and receptacle 104, respectively, may be any grounding technique, such as grounding through the conductive surface of the shells 106 or 108 of the connectors, grounding through added ground contacts isolated and connected to the equipment PCB, or grounding through a traditional single ground, and the like. For example, the plug's secondary ground connection 120 may be one or more outer contact points located on the outer surface of the outer shell 106 that connect with one or more inner contact points of the receptacle's ground connection 122. In an embodiment, the outer contact points of plug 102 may be positioned in an annular recess of shell 106, 106', as seen in FIGS. 2*a* and 2*b*. The inner contact points of receptacle 104 may be positioned on the inner surface of the shell 108. In an embodiment, the inner contact points of receptacle 104 may be positioned on spring tabs 182 (FIG. 1*d*) extending inwardly from the shell's inner surface. Alternatively, the outer contact points of the plug 102 and the inner contact points of the receptacle 104 may be positioned on or incorporated into one or more arms, tines, petals, beams, or the like.

Figure 3A:
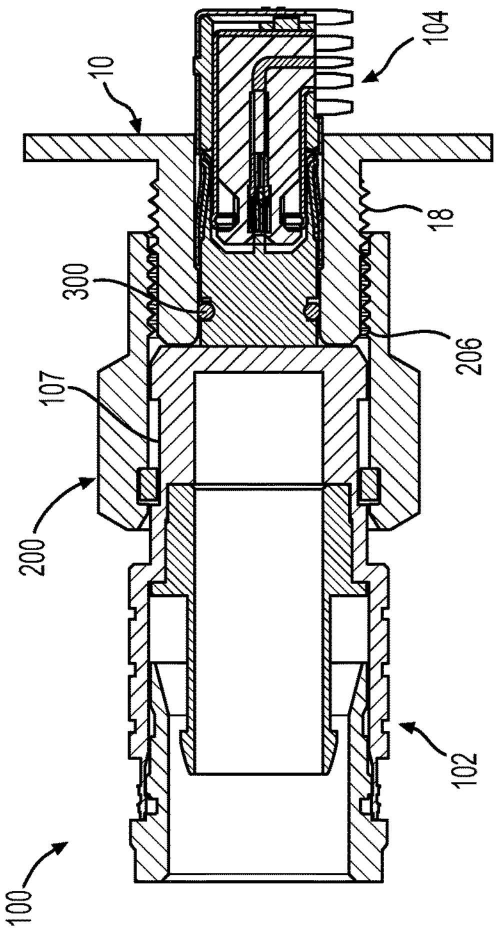
FIGS. 3*a* and 3*b* are exploded cross-sectional views of the mating components of FIGS. 1*a* and 1*b*, showing the mating components assembled without the engagement of a coupling member in FIG. 3*a* and with the engagement of a coupling member in FIG. 3*b;*
Figure 3B:
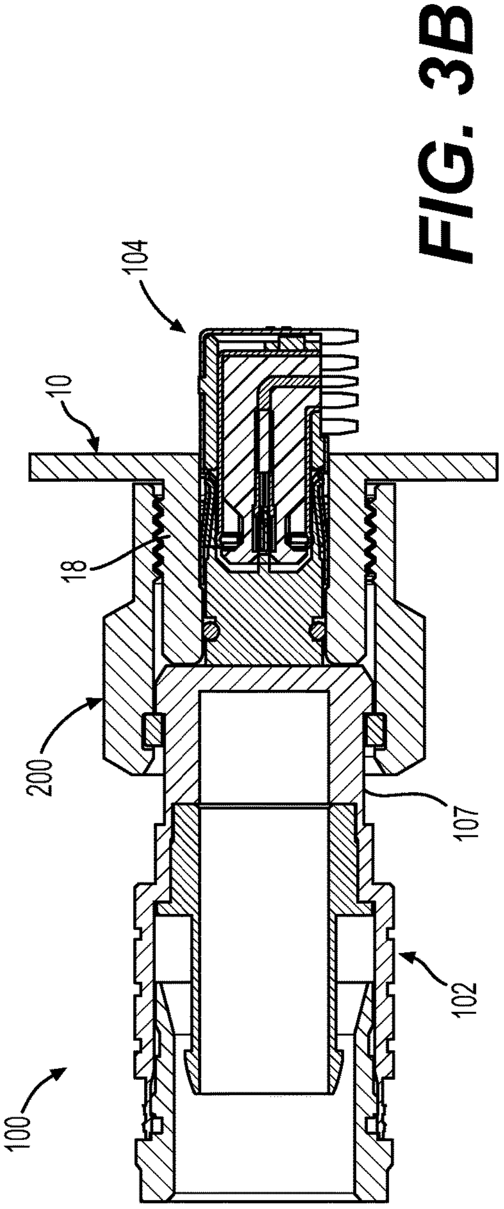

FIGS. 3*a* and 3*b* illustrate a cross-section of the assembly 100 of plug 102 and receptacle 104. To assemble the components, the front end 130 of plug 102 may be inserted into the front end 132 of receptacle 104 and then pushed onto the receptacle's inner shell 170. Internal grounding for the assembly is provided by primary ground connections 110 and 112, such as through the contact of the plug's inner contact points on the plug shell's inner surface with the inner contact points on the spring fingers of receptacle 104, thereby defining the primary grounding path through the connectors and the assembly 100. This pinned mating interface between plug 102 and receptacle 104 provides consistent RF impedance and therefore performance headroom for higher frequencies (up to 18 GHz).

Grounding is also provided by the secondary ground connections 120 and 122 separate from the primary ground connections 110 and 112. Secondary ground connections 120 and 122 define a secondary grounding path, such as through contact of the outer contact points of the plug 102 with the inner contact points on the inner spring tabs of the receptacle's shell 108. The engagement between the plug's outer contact points and the receptacle's spring tabs also provides a mechanical connection between plug 102 and receptacle 104. The added secondary grounding point provided by secondary grounding path may suppress RF leakage of the connector assembly 100 to achieve better than −100 dB even at high frequencies, e.g. −129.89 dB (for 1.2 GHz), −123.24 dB (for 3 GHz), and −117.47 dB (for 6 GHz).

In an embodiment, coupling member 200 may be a nut that can be rotatably coupled to the front end 130 of the plug's outer conductive shell 106, 106', as best seen in FIGS. 1*a*, 2*a*, and 2*b*. Nut 200 may have front and back sections 202 and 204. The nut's front section 202 can have an engagement feature 206, such as inner threads, as seen in FIG. 2*a*, configured to engage the body 12 of support panel 10 and the nut's back section 204 may have an outer gripping surface 208 to facilitate application of torque to the nut 200. A retaining ring 210 may also be provided inside the back section 204 of the nut 200 to retain the nut on the plug 102. A distal inner shoulder 212 may be provided at the nut's back section 204 for capturing the retaining ring 210 in an annular recess 107 of the plug's outer shell 106, 106'. Annular recess 107 is sized to allow the nut 200 to move axially with respect to the plug's outer shell 106, 106' between a disengaged position (FIG. 3*a*) and an engaged position (FIG. 3*b*).

As seen in FIGS. 1*c*, 2*a* and 2*b*, receptacle 104 can be mounted in the support panel 10. The support panel 10 may have a body 12 extending therefrom that has an inner bore 14 sized and configured to accept the receptacle 104. At least a portion of the body's outer surface 16 may have an engagement feature 18, such as outer threads, designed to cooperate with and engage the engagement feature 206, such as inner threads, of the nut 200 coupled to the plug 102. When the plug and receptacle 102 and 104 are mated, as described above, the space 220 (FIG. 2*a*) between the plug's conductive shell 106 and the front section 202 of the nut 200 receives the front of the body 12.

In its disengaged position, the inner threads 206 of the nut 200 are separated from the outer threads 18 of the receptacle's support panel 10 and the nut's shoulder 212 and the retaining ring 210 are axially located at or near the back of the annular recess 107 of the plug's conductive shell 106, as seen in FIG. 3*a*. Nut 200 can then be moved to its engaged position in which the nut 200, and the inner threads 206 thereof, engage the outer threads 18 of the receptacle's support panel 10, as seen in FIG. 3*b*, such that the nut's shoulder 212 and the retaining ring 210 are axially located at or near the front of annular recess 107 of the shell 106 of the plug 102. This threaded engagement provides an additional mechanical connection for mating of the plug and receptacle 102 and 104, thereby increasing the mechanical strength of the assembly 100. Although the engagement features 206 and 18 are shown as a threaded engagement between the nut 200 and the support panel's body 12, any known mechanical engagement may be used, such a snapping, bayonet, or interference fit engagement and the like.

As seen in FIGS. 2*a* and 2*b*, the sealing member 300 may be disposed around the front end 130 of the plug's outer shell 106, 106' in the space 220 of the nut 200. The sealing member 300 may be a piston or barrel seal, such as an O-ring or gasket made of a sealing material, such as rubber and the like. An annular channel or groove 109 may be provided in the outer surface of the shell 106 to hold the sealing member 300. As seen in FIGS. 3*a* and 3*b*, the sealing member 300 is between inner and outer diameters of the assembly 100 that generates compression to create an environmental seal sufficient for use of the assembly 100 outside. In particular, the outer diameter may be that of the front end 130 of the plug's shell 106 and the inner diameter may be that of the body 12 of the support panel 10. As such, the sealing member 300 can be disposed between the plug's outer shell 106 and the body 12 supporting the receptacle 104. This separates mating tightness of the assembly 100 from sealing performance. The sealing member 130 adds robustness and reliability to reduce connector field failures and associated repair costs, downtime, and customer dissatisfaction.

Figure 4A:
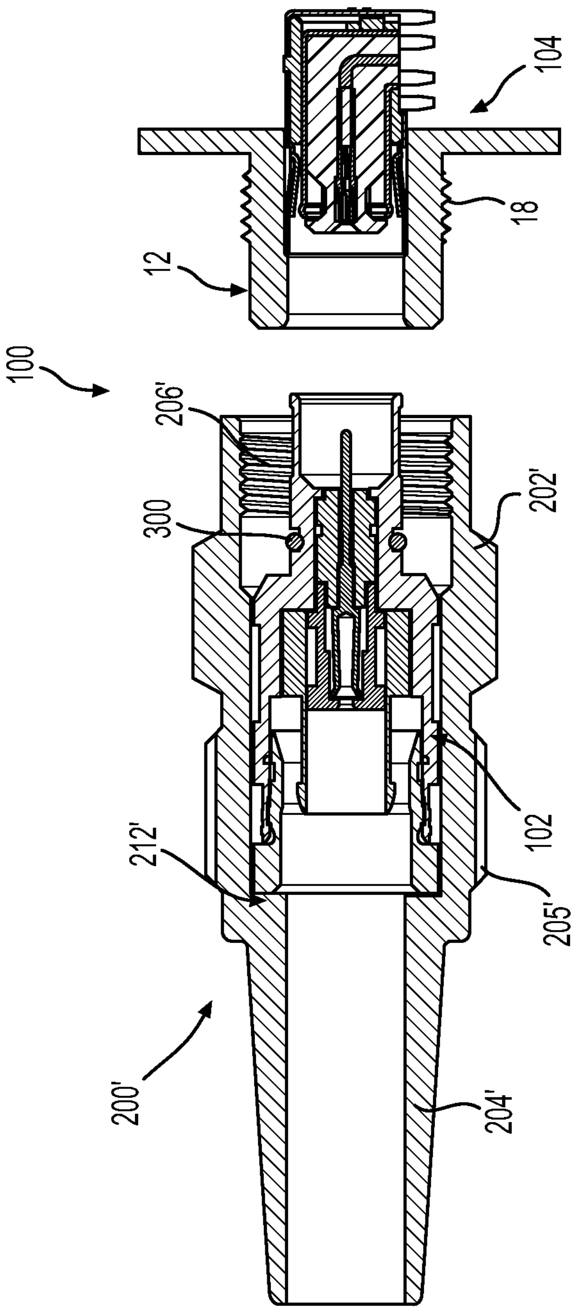
FIG. 4*a* is an exploded cross-sectional view of mating components of the electrical connectors and assembly thereof according to yet another exemplary embodiment of the present disclosure.
Figure 4B:
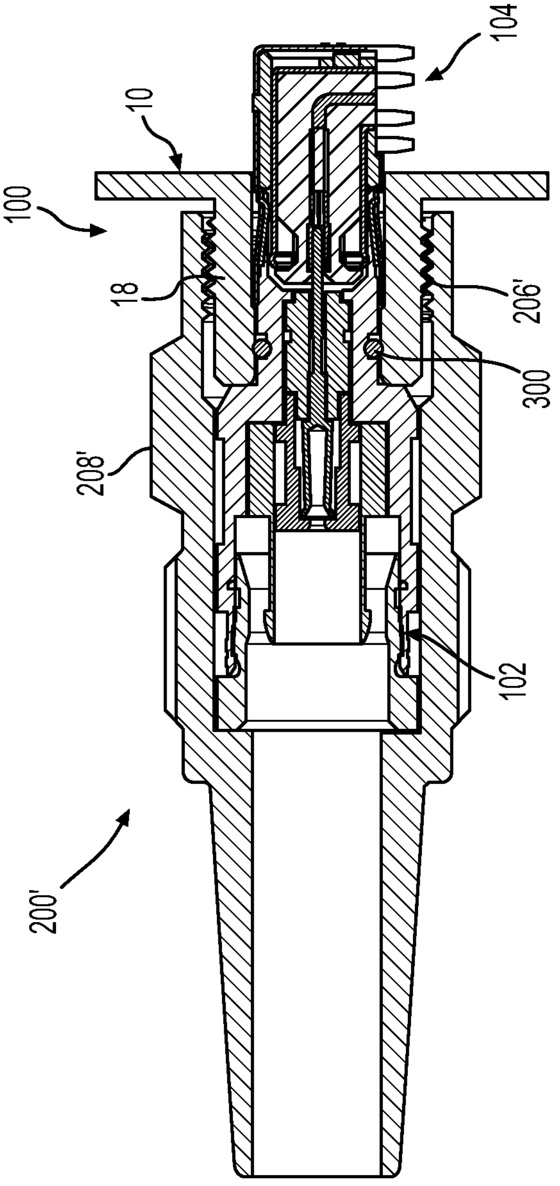
FIG. 4*b* is a cross-sectional view of the mating components illustrated in FIG. 6*a*, showing the mating components assembled.

FIGS. 4*a* and 4*b* illustrate another exemplary embodiment of the present disclosure in which the coupling member 200' is a sleeve instead of a nut. Like in the previous embodiments, the coupling member 200' may be rotatably coupled to the plug 102 and particularly to the plug's conductive shell 106 (or shell 106'). The sleeve 200' is configured to slide over the plug 102 to convert the plug 102 from an indoor to an outdoor use with the addition of the sealing member 300 on the plug 102. This eliminates the need for a field technician to carry both an indoor and outdoor version of the plug, thereby maximizing flexibility and minimizing connector variants in inventory. The sleeve 200' may be either plastic or metal.

The sleeve 200' may have an elongated body with a front section 202', a back section 204', and a middle section 205' therebetween. The front section 202' has an engagement feature 206', such as inner threads, configured to engage the corresponding engagement feature 18, e.g. outer threads 18, of the support panel 10 in manner similar to that described above. The sleeve's middle section 205' has an outer gripping surface 208' like that of the nut 200 to facilitate application of torque to the sleeve 200'. The back section 204' of the sleeve 200' is elongated and designed to accept and cover the end of the cable. An inner shoulder 212' is provided inside of the sleeve 200' to act as a stop against the back end 134, 134' of the plug 102. An optional seal such as a gasket may be provided at the shoulder 212' to increase robustness and compress around the cable as the interface of the assembly 100 is tightened.

When the plug 102 and 104 are mated, as described above, the sleeve 200' may be pushed forward and rotated to engage its inner threads 206' with the outer threads 18 of the body 12 supporting the receptacle 104, as seen in FIG. 4*b*. Although a threaded engagement between the sleeve 200' and the support panel's body 12, is shown, any known mechanical engagement may be used, such a snapping, bayonet, or interference fit engagement and the like.

In the embodiments of the present disclosure, the connectors may be round/tubular coaxial connectors and the ground features can be non-round shapes, such as square and still take advantage of the dual grounding shielding benefits. The secondary ground connection can be a directly integrated metal conductive component or positioned as an independent shield component isolated from the primary ground by a dielectric material, such as air or plastic.

The electrical connectors and assembly thereof of the present disclosure may (1) incorporate a push-on interface which simplifies mating to eliminate or reduce connectivity issues during self-installation applications; (2) provide higher density packaging potential by removing wrench clearance needs between connectors; (3) incorporate a pinned interface, i.e. there is a dedicated center contact or signal pin in the interface of the plug side of the connector eliminating the need to feed the cable center conductor through to the interface to become the center contact of the plug, for consistent RF impedance and therefore performance headroom for higher frequencies (up to 18 GHz) and for high reliability contact integrity and dependable extended field life; and/or (4) provide a robust scoop-proof interface configured such that when a mating connector is partially mated and then angled in any non-coaxial position, it is not possible to "scoop" with the mating interface and make contact with or damage any internal components thereof, such as the outer contact, insulator, or center contact. The scoop-proof configuration may be achieved, for example, by recessing the contact members in the outer ground/shroud.

The electrical connectors and assembly thereof of the present disclosure may also have a configuration that allows for full sheet metal construction for long term cost benefit such as by eliminating the need to manufacture threads; provides standard compression crimp termination and existing tools; and/or leverages field proven interface technology from latest generation CMTS routers, such as blind mate connections between printed circuit boards to achieve robust mechanical and electrical performance for the connector system.

While particular embodiments have been chosen to illustrate the disclosure, it will be understood by those skilled in the art that various changes and modifications can be made therein without departing from the scope of the disclosure as defined in the appended claims.

What is claimed is:

1. An electrical connector assembly, comprising:

a receptacle including a conductive shell supporting at least one socket contact therein, the conductive shell having a front end and a back end configured to electrically connect to a printed circuit board;

a support panel associated with the receptacle;

a plug including a conductive shell supporting at least one pin contact configured to mate with the at least one socket contact of the receptacle, the conductive shell of the plug having a front end configured to mate with the front end of the receptacle, and a back end configured to electrically connect to a coaxial cable, and a sealing member disposed on the conductive shell, the sealing member being configured to provide an environmental seal at or near a mating interface of the receptacle and plug; and a coupling member coupled to the conductive shell of the plug, the coupling member being configured to engage the support panel.

2. The assembly of claim 1, wherein the coupling member is rotatably coupled to the conductive shell of the plug, the coupling member has an engagement feature configured to engage a corresponding engagement feature of the support panel.

3. The assembly of claim 2, wherein the engagement feature of the coupling member is inner threads at a front section thereof and the corresponding engagement feature of the support panel is outer threads.

4. The assembly of claim 2, wherein the coupling member is a nut that is axially movable with respect to the conductive shell of the plug between a disengaged position and an engaged position.

5. The assembly of claim 2, wherein the coupling member is a sleeve that includes an elongated body with a back section configured to cover an end of the coaxial cable and a middle section between the front and back sections that has an outer gripping surface.

6. The assembly of claim 1, wherein the front ends of the receptacle and plug mate with one another such that the signal and pin contacts engage one another, thereby mechanically and electrically connecting the receptacle and plug.

7. The assembly of claim 1, wherein the sealing member is a sealing ring disposed around the front end of the conductive shell of the plug.

8. The assembly of claim 1, wherein the receptacle has a receptacle ground connection located inside or on the conductive shell and the plug has a plug ground connection located on the conductive shell of the plug, and the receptacle and plug ground connections form a primary grounding path through the assembly and wherein the receptacle and plug have secondary ground connections, respectively, that form a secondary grounding path through the assembly separate from the primary grounding path.

9. The assembly of claim 8, wherein the receptacle primary ground connection is one or more inner contact points inside of the conductive shell of the receptacle; and the plug primary ground connection is one or more inner contact points on an inner surface of the conductive shell of the plug configured to connect with the one or more inner contact points of the receptacle primary ground connection to form the primary grounding path.

10. The assembly of claim 9, wherein the secondary ground connection of the receptacle is located on an inner surface of the conductive shell of the receptacle; and the secondary ground connection of the plug is located on an outer surface of the conductive shell of the plug.

11. A method of assembly electrical connector components, comprising the steps of:

inserting a pin of a plug component into a socket of a receptacle component, thereby electrical connecting the plug component and the receptacle component;

axially moving a coupling member, that is rotatably coupled to the plug component, from a disengagement position to an engaged position;

engaging the coupling member with a support panel, in which the receptacle component is mounted, to form a mechanical connection between the plug component and the receptacle component; and sealing the engagement between the coupling member and the support panel.

12. The method of claim 11, wherein the coupling member is moved axially with respect to the plug component after the pin is inserted into the socket.

13. The method of claim 11, wherein a sealing member is used in the sealing engagement between the coupling member and the support panel, wherein the sealing member comprises a sealing ring disposed around a front end of a conductive shell of the plug.

14. The method of claim 11, wherein the receptacle component includes a conductive shell supporting at least one socket contact therein, the conductive shell having a front end and a back end configured to electrically connect to a printed circuit board.

15. The method of claim 14, wherein a support panel is associated with the receptacle component.

16. The method of claim 14, wherein the plug component comprises a conductive shell supporting at least one pin contact configured to mate with the at least one socket contact of the receptacle component, the conductive shell of the plug component having a front end configured to mate with the front end of the receptacle component, and a back end configured to electrically connect to a coaxial cable, and a sealing member disposed on the conductive shell, the sealing member being configured to provide an environmental seal at or near a mating interface of the receptacle component and the plug component.

* * * * *